Jan. 17, 1967  NOBORU MORIFUJI  3,298,410
SCREW HOLDER STRUCTURE FOR USE WITH SCREW DRIVERS
Filed Jan. 28, 1965  2 Sheets-Sheet 1

INVENTOR.
NOBORU MORIFUJI
BY
Farley Forster & Farley

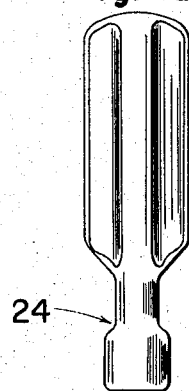
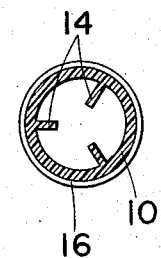
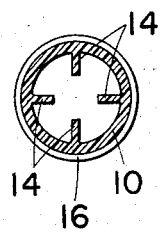
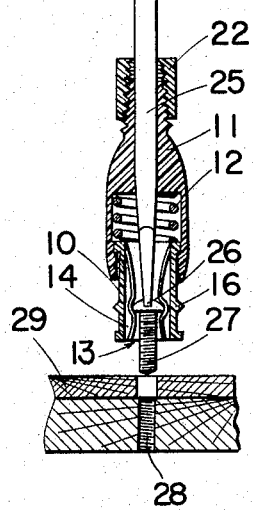
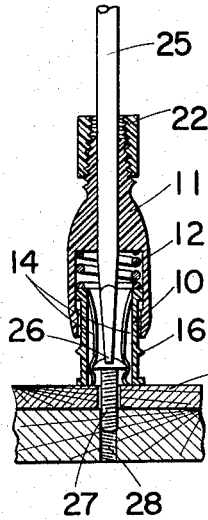
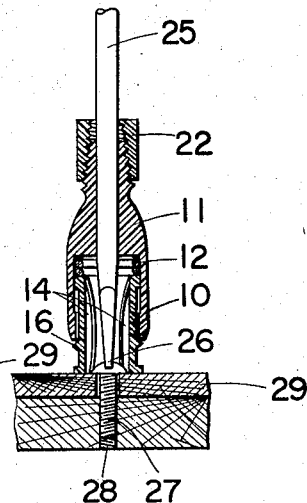

United States Patent Office

3,298,410
Patented Jan. 17, 1967

---

3,298,410
SCREW HOLDER STRUCTURE FOR USE WITH SCREW DRIVERS
Noboru Morifuji, Osaka-shi, Japan, assignor to Morifuji Haguruma Seisakusho Co., Ltd., Osaka-shi, Japan, a corporation of Japan
Filed Jan. 28, 1965, Ser. No. 428,718
Claims priority, application Japan, Jan. 31, 1964, 39/6,610
9 Claims. (Cl. 145—52)

The present invention relates to a screw holder structure for use with screw drivers adapted to be attached to an associated screw driver adjacent to the driving or blade end thereof, whereby in screwing and unscrewing operations it holds a set screw or the like adjacent the blade of said screw driver. More particularly, it relates to a screw holder structure comprising a movable screw retainer and a cylindrical body for attachment to an associated screw driver.

An object of the invention is to provide a screw holder structure which, when it once holds a screw, makes it possible to operate the screw driver in the same manner as the usual screwing operation and without the need of manually holding the screw until the latter is completely driven into the objective part.

Another object of the invention is to provide a screw holder structure which, also in unscrewing operation, dependably performs its duty while allowing the operation of the associated screw driver in a manner not unchanged from the usual manner.

A further object is to provide a rugged holder structure of the type referred to above.

A still further object is to provide a screw holder structure which can be easily attached to a screw driver.

The invention will now be described by way of example and with reference to the accompanying drawings wherein:

FIGURE 3 is a transversely sectioned plan view taken along line 3—3 of FIGURE 2.

FIGURES 4a, 4b and 4c are longitudinally sectioned side-views of the holder structure in an operated position, with the illustration of the driver grip omitted in FIGURES 4b and 4c;

FIGURE 6 is a transversely sectioned plan view showing still another embodiment of the invention.

Figure 1:
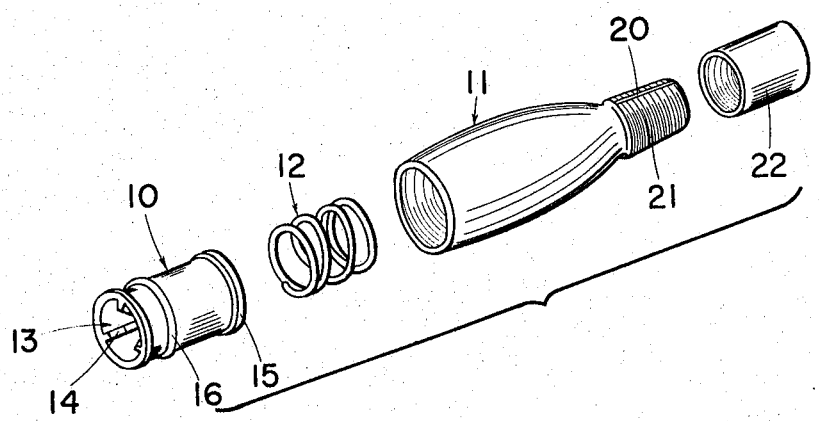
FIGURE 1 is an exploded perspective view of a screw holder structure according to the invention.
Figure 2:
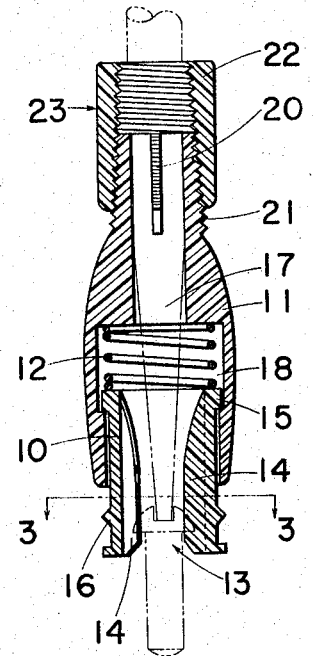
FIGURE 2 is a longitudinally sectioned side-view of the holder structure in an assembled position.

As shown in FIGURE 1, a screw holder structure for use with screw drivers according to the invention comprises a screw retainer 10, a cylindrical body 11 for attachment to an associated screw driver, and a spring means 12. The screw retainer 10 is made of a transparent and resilient synthetic resin material and has an interior screw-holding section 13 which, as shown in FIGURES 2 and 3, is provided with a plurality of axially extending resilient fins 14. These resilient fins 14 are made of the same material as the screw holder 10 and are formed integrally therewith to project therefrom. The screw retainer 10 has an outer peripheral flange 15 provided at one end thereof and an annular projection 16 provided on the outer surface adjacent the other end thereof, said annular projection serving as a locating mark for positioning the driving or blade end of the associated screw driver level with the mark.

The aforesaid cylindrical attachment body 11 is made also of a transparent and resilient synthetic resin material and is provided with an axial bore 17 having at its intermediate portion a larger diameter bore portion 18 adapted to receive the aforesaid screw retainer 10 in such a manner that the flange 15 of said retainer can be axially moved within a predetermined limit. Thus, the screw retainer 10 fitted in the cylindrical attachment body 11 by engagement between the bore portion 18 and the flange 15 is allowed to be rotated around the axis of the body 11, with its screw-holding section 13 and annular projection 16 projecting beyond one end of the cylindrical body 11. The aforesaid spring means 12, which is interposed between the larger diameter bore portion 18 and the flange 15, maintains the screw retainer 10 in position as projecting through the cylindrical attachment body 11. In this embodiment, a coiled spring is utilized as the spring means 12. The lower end portion of the cylindrical attachment body 11 is slitted at 20 and taper-threaded at 21. The taper-threaded portion 21 together with a matting threaded cylindrical piece 22 constitutes a clamping assembly section 23.

How to fix the screw holder structure will now be described.

First, as shown in FIGURE 2 phantom lines and also in FIGURE 4a, the cylindrical attachment body 11 is brought onto the spindle 24 of a screw driver 25 from its clamping assembly section 23. The cylindrical piece 22 is then rotated to contract the taper-threaded portion 21, whereby the cylindrical attachment body 11 is fixed to the spindle 25 in such a manner that the blade end 26 of the driver 24 is positioned level with the annular projection 16 as viewed from the outside. In addition, it does not matter to the manner of fixing the present article whether the driver 24 has a flat or cross blade or it is hand or power operated.

Next, how to screw a set screw 27 into a hole 28 will be described.

First, as shown in FIGURE 4a, the set screw 27 is inserted into the screw-holding section 13 of the screw retainer 10 so that the set screw head may be engaged with the blade 26 of the driver. At this time, the resilient projecting fins 14, of course, are flexed by the set screw head, and are effective in holding such screws and bolts as having heads of sufficient dimensions to be firmly held thereby. The set screw 27 thus held is then engaged with the threaded hole 28, followed by the rotation of the driver 24. In so doing, when the set screw reaches a certain depth as indicated in FIGURE 4b, the screw retainer 10 bears against the member 29 in which the threaded hole is provided. However, with the screw holder structure according to the invention, a continued screwing operation will allow the screw retainer 10 to move back against the pressure of the spring means 12 relative to the driver spindle 25 and cylindrical attachment body 11. Thus, the set screw 27 can be perfectly tightened without any additional operations except for a continued usual rotation of the driver, as shown in FIGURE 4c. Further, since the screw retainer 10 can be rotated around the axis relative to the cylindrical attachment body 11, there is no possibility of causing the rotation of the retainer relative to the member 29 until the completion of screwing operation, and thus it can retain the set screw head in a satisfactory position involving no fear of causing undesirable displacement thereof.

Also in unscrewing or removing the set screw 27, as shown in FIGURE 4c, the driver 24 is urged against the member 29 with the set screw head received in the screw retainer 10, whereby the latter is moved back relative to the cylindrical attachment body 11 until the working end 26 is engaged with the set screw head. Thereupon, the driver 24 is rotated in the opposite direction to withdraw the set screw 27.

It is to be noted that as shown in FIGURE 4b such withdrawal of the set screw causes the gradual emergence of the screw retainer 10 from the cylindrical attachment body 11 owing to the pressure of the spring means 12, with the result that the resilient fins 14 projecting from the screw-holding section 13 automatically and resiliently embrace the set screw head. Also in this case, since the screw retainer 10 remains stationary in spite of the rotation of the cylindrical attachment body 11, the head of the set screw partially withdrawn can be firmly held.

Figure 5:
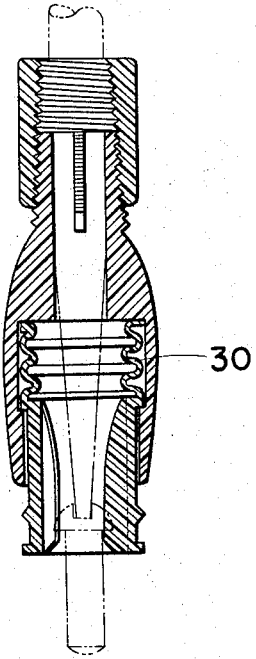
FIGURE 5 is a longitudinally sectioned side-view showing another embodiment of the invention.

While a coiled spring is employed as the spring means 12 in the preceding embodiment, a resilient bellows 30 of resilient synthetic resin may be used, as shown in FIGURE 5. In this case, the bellows 30 is formed preferably integrally with the screw retainer 10 as shown.

While the resilient fins 14 used are three in number as shown in FIGURE 3, four or more resilient fins may be provided as shown in FIGURE 6.

From the foregoing, it will be understood that a novel screw holder structure according to the invention, if attached to a screw driver and receiving a screw therein adjacent to the working end of the driver, makes it possible in the case of, for example, tightening the screw into the objective part to effect dependable tightening of the screw without the need of taking manual troubles until the completion of tightening operation just in the same manner as the usual screw drivers. It is also seen that since the screw retainer is adapted to be rotatable and free from distortion when abutting against the objective part, the set screw can be firmly held until the completion of screwing or unscrewing operation. This shows the fact that the articles constructed according to the invention safely endure their prolonged use and that they dependably hold screws when gradually screwed or unscrewed.

While the screw holder structures according to the invention achieve extremely efficient and reasonable screwing and unscrewing operations, they are effective particularly when screwing and/or unscrewing must be effected where it is difficult or impossible for operators to insert their hands or fingers, because screws when sepaarted from such parts of difficult access can be withdrawn by withdrawing the drivers on which they are mounted. Of course, they are likewise conveniently used in tightening screws.

While the preferred forms of the invention have been shown and described herein, it is to be understood that numerous changes in details of construction and arrangement may be resorted to without departing from the spirit and scope of the invention as hereinafter claimed.

I claim:

1. A screw holder for use with screw drivers comprising a cylindrical sleeve, means for mounting said sleeve on the shank of a screw driver at the blade end thereof, a resilient cylindrical screw retainer telescoped within the free end of said cylindrical sleeve and being axially slidable therein within a predetermined limit, and spring means to urge the screw retainer outwardly of the free end of said cylindrical sleeve whereby said screw retainer projects beyond the end of said shank to grip the head of a screw.

2. A screw holder as defined in claim 1 wherein said cylindrical sleeve has an axially elongated annular groove in the internal surface thereof, an annular flange formed on said screw retainer and received in said groove for permitting sliding movement thereof within said predetermined limit.

3. A screw holder structure for use with screw drivers as claimed in claim 1, wherein the free end of the screw retainer is provided with a plurality of resilient fins substantially axially extending and inwardly projecting therefrom.

4. A screw holder structure for use with screw drivers as claimed in claim 1, wherein the screw retainer is made of a substantially transparent, resilient synthetic resin material.

5. A screw holder structure for use with screw drivers as claimed in claim 4, wherein the portion of the substantially transparent screw retainer projecting beyond the cylindrical attachment body is provided with a locating mark for the working end of a screw driver.

6. A screw holder structure for use with screw drivers as claimed in claim 1, wherein the screw retainer and the cylindrical attachment body are both made of a substantially transparent, resilient synthetic resin material.

7. A screw holder structure for use with screw drivers as claimed in claim 1, wherein the spring means is a coiled spring.

8. A screw holder structure for use with screw drivers as claimed in claim 1, wherein the spring means is a resilient bellows of synthetic resin.

9. A screw holder structure for use with screw drivers as claimed in claim 8, wherein the resilient bellows of synthetic resin is constructed integrally with the screw retainer.

References Cited by the Examiner

UNITED STATES PATENTS

| | | |
|---|---|---|
| 1,708,766 | 4/1929 | Lochner. |
| 2,723,694 | 11/1955 | Ross. |
| 2,758,621 | 8/1956 | Alexander _____ 145—52 |

WILLIAM FELDMAN, *Primary Examiner.*

R. V. PARKER, *Assistant Examiner.*